United States Patent [19]
Moeller et al.

[11] Patent Number: 5,497,920
[45] Date of Patent: Mar. 12, 1996

[54] QUICKLY REFILLABLE SPLASH RESISTANT SPORTS BOTTLE

[75] Inventors: Michael D. Moeller, 5076 Corte Ala Cante, Oceanside, Calif. 92057; Phillip C. Burke, Temecula, Calif.; Thomas H. Campbell, Hemet, Calif.

[73] Assignee: Michael D. Moeller, Oceanside, Calif.

[21] Appl. No.: 136,011

[22] Filed: Oct. 14, 1993

[51] Int. Cl.$^6$ ........................................ B62J 7/06
[52] U.S. Cl. ........................... 224/36; 224/148; 220/719; 220/731; 210/474; 210/496
[58] Field of Search ........................ 224/148, 30 A, 224/32 R, 36, 37, 39, 41, 42.46 R, 42.45 R; 215/1 A, 229, 308, 388, 363, 364; 248/311.2, 312, 316.7, 231.8, 302; 220/709, 719, 734, 731, 371; 210/477, 474, 496

[56] References Cited

U.S. PATENT DOCUMENTS

| | | | |
|---|---|---|---|
| 591,390 | 10/1897 | Dunnigan | 224/36 |
| 1,311,628 | 7/1919 | Walsh | 248/302 |
| 3,360,160 | 12/1967 | Spencer | 220/719 |
| 3,360,161 | 12/1967 | Smith | 220/719 |
| 4,176,770 | 12/1979 | Griggs et al. | 224/30 A |
| 4,754,902 | 7/1988 | Opfergelt | 224/148 |
| 5,197,640 | 3/1993 | Hurley et al. | 224/36 |

FOREIGN PATENT DOCUMENTS

| 618040 | 3/1927 | France | 224/30 R |
|---|---|---|---|

Primary Examiner—Linda J. Sholl
Attorney, Agent, or Firm—Roy A. Ekstrand

[57] ABSTRACT

A sports bottle includes a generally cylindrical hollow vessel having a liquid chamber formed therein and a closed end bottom. The generally cylindrical vessel further defines a reduced diameter neck portion and an upper chamber terminating in an upwardly facing mouth. The upper chamber supports a porous antisplash element preferably formed of a coarse porous foam material plastic or the like. An elongated tubular straw extends from the bottom surface within the vessel upwardly through the neck portion and through the antisplash element and beyond the mouth to form an upwardly extending end which receives a flexible mouth tube which is preferably curved toward the user when the sports bottle is secured to a conventional bicycle. In alternate embodiments, the antisplash element within the upper chamber of the vessel is formed of a plurality of tubular members defining passages therethrough and grouped together to form a generally cylindrical multipassage combination. In still further alternate embodiments, a flexible planar member having a plurality of flexible generally triangular segments is secured to the mouth portion of the vessel to provide an antisplash element. In a still further alternate embodiment, a generally planar valve member is pivotally supported within the mouth portion of the vessel and is pivoted to an open position as liquid is poured into the vessel mouth.

7 Claims, 1 Drawing Sheet

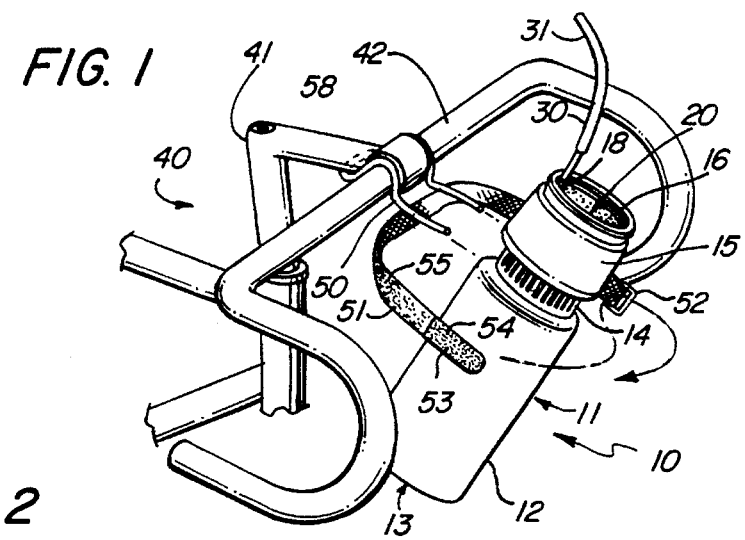
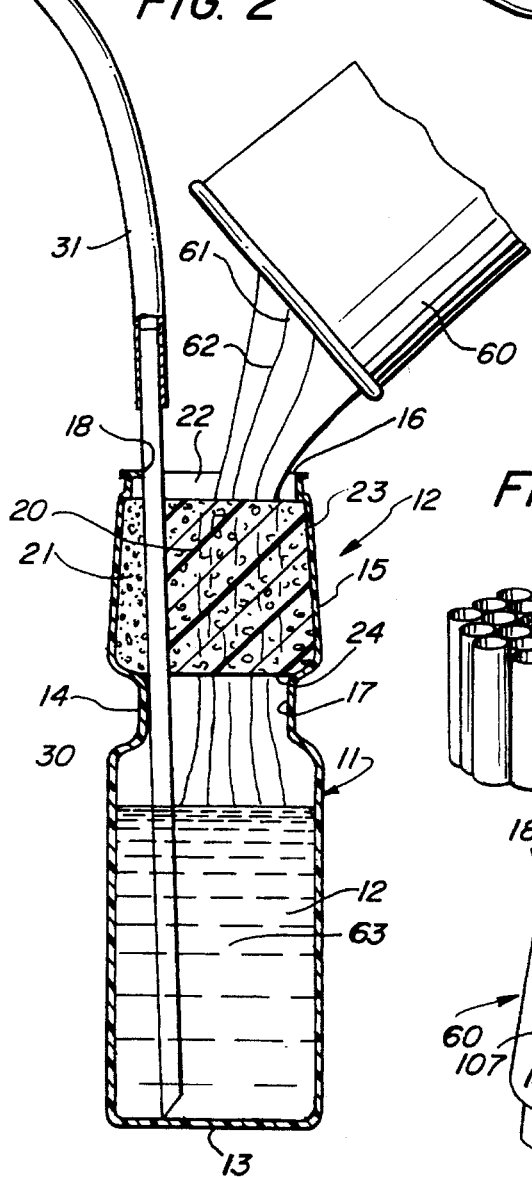
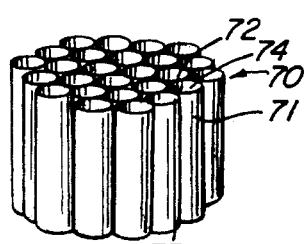
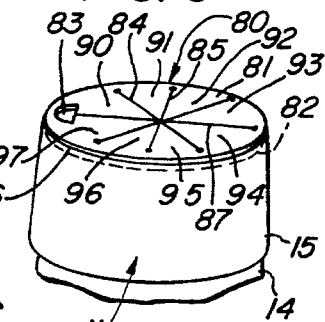
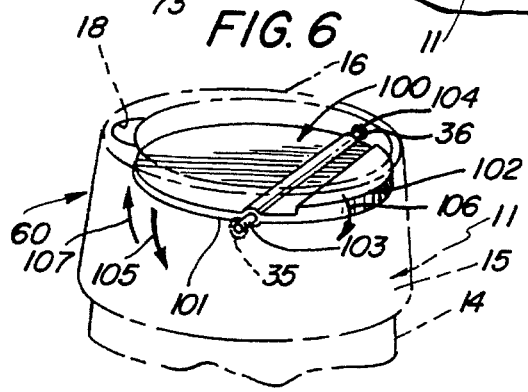

QUICKLY REFILLABLE SPLASH RESISTANT SPORTS BOTTLE

SPECIFICATION

1. Field of the Invention

This invention relates generally to sports apparatus and particularly to liquid supply bottles used during sports activities.

2. Background of the Invention

One of the most critical needs facing serious cyclists and particularly those engaging in competitive racing events is the provision of a continuous supply of drinking water or sports drink as they cycle. During extended endurance-type events, the athletes face serious dehydration problems and the loss of competitive capability unless they continuously replenish the fluids lost during such events. Typically, the cyclists utilize a conventional water bottle formed of a molded plastic material which is secured to a convenient portion of the bicycle frame and which is periodically removed from the holder and used to supply drinking water. The most common type of molded plastic water bottle employs a neck portion supporting a removable cap and a push/pull valve. In its normal use, the valve is opened and the cyclist inverts the bottle while rising up from the aerodynamic or "tuck" position to a raised position and while holding the bottle upwardly and pointing the valve toward the user's mouth squeezing the plastic bottle to dispense or squirt liquid into the user's mouth. While this system and water bottle apparatus does permit the user to obtain a drink of water while continuing to cycle, it is subject to several serious limitations. Among these limitations are the loss of speed associated with the cyclist rising from the aerodynamic position to the raised position during the drinking process. In addition, refilling or replenishing the supply of liquid within the bottle requires the cap removal and the diversion of the user's attention from the race course while manipulating the cap.

Faced with the limitations of such conventional water bottles, practitioners in the art have endeavored to provide improved systems which overcome the inherent limitations in such water bottles. These efforts have resulted in systems in which water bottles are equipped with a integral straw supported by the removable lid which permits the user to avoid having to rise up to take a drink of water. Other systems which may be described generally as "bladder systems" include a water reservoir or bladder which receives a water supply and is supported at some convenient location either on the bicycle or upon the cyclist's body. The water bladder is coupled through various tubing elements to a discharged nozzle conveniently supported upon the bicycle. The intent of such bladder systems is that the bladder be squeezed or manipulated to discharge water outwardly through the nozzle when needed. Such systems, however, have been plagued by difficulties in refilling the water bladder and usually require that the cyclist stop to refill the bladder.

Despite practitioners efforts to provide improved systems, there remains nonetheless a continuing need in the art for evermore improved liquid supply apparatus for use by athletes such as cyclists or the like.

SUMMARY OF THE INVENTION

Accordingly it is a general object of the present invention to provide an improved sports bottle. It is a more particular object of the present invention to provide an improved sports bottle which is quickly and easily refillable. It is a still more particular object of the present invention to provide an improved sports bottle which is quickly and easily refillable and which is resistant to liquid splashing during vigorous activity.

In accordance with the present invention, there is provided for use in receiving, storing and dispensing a liquid, a sports bottle comprises: a vessel defining an interior storage chamber and an upwardly open mouth; an antisplash means supported by the vessel proximate the mouth for receiving a flow of liquid through the mouth and into the interior chamber and for inhibiting splashing liquid within the chamber from passing outwardly through the mouth; and a suction tube defining an elongated hollow tube having a first end within the interior chamber and a second end extending upwardly beyond the mouth.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a sports bottle constructed in accordance with the present invention being secured to a typical bicycle;

FIG. 2 sets forth a section view of the present invention sports bottle;

FIG. 3 sets forth a perspective view of the splash resistant member of the present invention sports bottle;

FIG. 4 sets forth a perspective view of the an alternate embodiment of the splash resistant portion of the present invention sports bottle;

FIG. 5 sets forth a perspective view of a still further alternate embodiment of the present invention sports bottle; and FIG. 6 sets forth a perspective view of a still further alternate embodiment of the present invention sports bottle.

DESCRIPTION OF THE PREFERRED EMBODIMENTS

FIG. 1 sets forth a perspective view of a sports bottle constructed in accordance with the present invention and generally referenced by numeral 10 being assembled to a typical bicycle generally referenced by numeral 40. Sports bottle 10 includes a generally cylindrical vessel 11 preferably formed of a hollow molded plastic material and defining a cylindrical liquid chamber 12 having a closed bottom surface 13,. Vessel 11 further defines an inwardly extending reduced diameter neck portion and an upper chamber 15. Upper chamber 15 terminates in an open mouth 16. In accordance with an important aspect of the present invention, upper chamber 15 receives and supports an antisplash element 20 formed of an open cell porous foam material. As is better seen in FIG. 3, antisplash element 20 defines a notch 21 extending through its outer edge which receives an elongated cylindrical straw 30. Straw 30 is preferably formed of a relatively rigid tubular plastic material or the like. A flexible mouth tube 31 is secured to the outer end of straw 30 and is preferably curved in the manner shown.

Bicycle 40 is representative of virtually any conventional bicycle in which an upwardly extending stem 41 supports a pair of handle bars 42. In further accordance with conventional fabrication techniques, handle bars 42 are secured to stem 41 in the manner shown. It will be apparent to those skilled in the art that bicycle 40 and the structure of stem 41 and handle bar 42 are merely representative of conventional bicycle fabrications and the present invention is not limited to any particular bicycle fabrication.

In further accordance with the present invention, a multiply curved mounting bracket 50 defines a loop portion 58 and a pair of spaced apart end prongs 56 and 57. Mounting bracket 50 is preferably formed of a relatively rigid but somewhat resilient material such as aluminum, titanium or resilient hard plastic. Mounting bracket 50 is receivable upon stem 41 at loop portion 58 such that prongs 56 and 57 extend forwardly in the manner shown. The spacing between prongs 56 and 57 is preferably selected to define a space therebetween which is slightly smaller than the dimension of neck 14. Thus, in assembling sports bottle 10 to bicycle 40, vessel 11 is positioned such that prongs 56 and 57 are spaced on either side of neck 14 afterwhich neck 14 is forced between prongs 56 and 57 which, due to their resilience, spread to accommodate neck 14 and thereby grasp vessel 11. Mounting strap 50 is preferably formed of a flexible material such as polyester fabric or the like and supports a fabric attachment pad 55 on the outer surface thereof. Mounting strap 51 further includes an end portion 53 which supports an attachment fabric pad 54. In their preferred form, attachment pads 54 and 55 comprise cooperating fabric attachment elements such as the popular hook and loop fabric attachment apparatus. Thus, end 53 is securable to fabric attachment pad 55 by the cooperation of fabric attachment pads 54 and 55. Mounting strap 51 further defines a loop 52 which is configured to receive end 53 as end 53 is threaded through loop 52.

In operation once vessel 11 is received between prongs 56 and 57 at neck 14, mounting strap 51 is wound about the desired portions of neck 14 and handle bar 42 and encircles a portion of neck 14 as end 53 is looped through loop 52. Thereafter, end 53 and strap 51 is drawn tightly through loop 52 tightening mounting strap 51 in place within the reduced portion of neck 14 and end 53 is placed overlying fabric attachment 55 and secured in place by the cooperation of fabric attachment pads 54 and 55. Alternatively, it may be desirable in some cycle configurations to simply loop mounting strap 51 about mounting bracket 50 and neck 14 and tighten mounting strap 51 by looping end 53 through loop 52 and drawing it about attachment pad 55.

Once sports bottle 10 is secured to mounting bracket 50, mouth tube 31 extends upwardly and rearwardly toward the cyclist and is conveniently accessible when the cyclist is in the aerodynamic or tucked position bringing the cyclist's head very close to handle bar 42. Thus, the user is able to conveniently draw water from sports bottle 10 through mouth tube 31 while maintaining full competitive activity. In accordance with an important aspect of the present invention, the user is able to replenish the supply of liquid within sports bottle 10 while continuing to move by simply pouring the liquid into mouth 16 through splash element 20 and into liquid chamber 12. As is common practice in most long distance cycling activities, various water stations are positioned along the event route to provide water to the cyclists as they pass by. Typically, one or more persons at the water station will hold out bottles, cups or other containers of water which the cyclists simply grab as they pass through the water station. In contrast to the prior art devices which require considerable effort on the cyclist's part to remove the lid and permit refilling of the bottle or replace existing bottle, the present invention system imposes very little burden, if any, upon the cyclist in refilling the sports bottle due to its novel splash element which is sufficiently porous to offer very little resistance to the water poured into the sports bottle. In further accordance with the present invention, the presence of splash element 20 within upper chamber 15 precludes loss of the water supply within liquid chamber 12 due to splashing as the cyclist traverses the often rough surface of the event course.

FIG. 2 sets forth a section view of the present invention sports bottle showing a typical refill operation. As described above, sports bottle 10 includes a molded plastic vessel 11 defining a liquid chamber 12 and a bottom surface 13. Vessel 11 further defines a reduced diameter neck portion 14 having a neck passage 17 formed therein. Vessel 11 further includes an upper chamber 15 forming an upwardly facing mouth opening mouth 16. Mouth 16 further defines a notch 18 which receives a portion of straw 30. An antisplash element 20 formed of a porous plastic material or the like is received within upper chamber 15 and generally conforms to the interior of upper chamber 15. Antisplash element 20 defines a notch 21 through which straw 30 extends downwardly into liquid chamber 12. Straw 30 is preferably formed of an elongated relatively rigid cylindrical tube having sufficient length to extend from bottom portion 13 upwardly through neck passage 17 and notches 21 and 18 formed in antisplash element 20 and mouth 16 respectively. A flexible curved mouth tube 31 is secured to the upper end of straw 30 and is preferably curved in the manner shown in FIGS. 1 and 2 to facilitate the access thereto by the cyclist in the aerodynamic position described above.

In accordance with an important aspect of the present invention, the open celled porous structure of antisplash element 20 is selected to have a relatively coarse porosity and thereby exhibits very little resistance to liquid poured upon antisplash element 20 through mouth 16. Accordingly, FIG. 2 shows a typical refilling operation of the present invention sports bottle in which a refill cup 60 containing a supply of water 61 is simply poured into mouth 16 forming a downwardly extending water stream 62. Water stream 62 passes through mouth 16 and through antisplash element 20 in a very high rate flow to eventually be received within liquid chamber 12 forming a stored water supply 63. In further accordance with an important aspect of the present invention, the placement of antisplash element 20 within upper chamber 15 above stored water supply 63 provides an antisplash element in which splashing of water supply 63 due to vibrations imposed upon sports bottle 12 are dampened and largely absorbed by the randomly porous open structure of antisplash element 20 to prevent splashing out from bottle 12. In essence, antisplash element 20 acts as a retarder of brief duration splashes of liquid from stored supply 63 and tends to slow or disperse such liquid splashes to the extent that little, if any, liquid reaches mouth 16 due to splashing action. Thus, antisplash element 20 offers little resistance to heavy water flow in the downward direction due to its open foam porous structure but tends to slow and disperse upwardly moving splashed liquid and offers sufficient resistance that splashing of the liquid from within liquid chamber 12 is virtually eliminated.

It will be apparent to those skilled in the art that this rapid or quick refill capability of the present invention sports bottle offers substantial advantage in the competitive cycling environment by providing the cyclist with the capability of simply reaching out and grabbing the extended water bottle at the water station and in a simple motion requiring virtually no attention diversion from the race course ahead, the cyclist simply dumps the water into the large mouth area of the sports bottle. In addition, the provision of notch 18 in mouth 16 and notch 21 in antisplash element 20 maintains straw 30 in a fixed position and thereby properly positions the mouth tube for use by the cyclist.

FIG. 3 sets forth a perspective view of antisplash element 20. As described above, antisplash element 20 is preferably formed of a porous open celled material such as molded plastic or the like which is substantially coarse porosity in order to offer little resistance to liquid poured through antisplash element 20. In its preferred form, antisplash element 20 is generally cylindrical and sufficiently resilient to be received within and conformed to upper chamber 15 of vessel 11 (seen in FIG. 2). Antisplash element 20 defines a notch 21, a cylindrical sidewall 23, an upper surface 22 and a bottom surface 24.

FIG. 4 sets forth a perspective view of an alternate embodiment antisplash element generally referenced by numeral 70. Antisplash element 70 is formed of a plurality of tubular members 71 arranged in a generally cylindrical configuration and mutually secured by conventional attachment means such as adhesive bonding or the like. Thus, tubular members 71 each define elongated generally cylindrical members having upper edges 72 and lower edges 73 and a cylindrical passage 74 extending therebetween. In their preferred form, tubular members 71 are formed of a somewhat resilient material such as molded plastic or the like and thus form a combined cylindrical element which may be fitted within upper chamber 15 of vessel 11 in place of antisplash element 20 (seen in FIG. 2) and generally conformed to the interior of upper chamber 15. It will be apparent to those skilled in the art that the diameters of tubular members 71 may be selected in accordance with design preferences with the operative limitations being that passages 74 are sufficient in size to facilitate the flow of water through antisplash element 70 during the refilling process while at the same time being sufficiently small to provide an antisplash characteristic when antisplash element 70 is secured within sports bottle 12. In the application of antisplash element 70 to the present invention sports bottle, straw 30 is, alternatively, inserted through a selected tubular member passage or inserted through a void or spacing provided within the array of tubular members.

In operation, antisplash element 70 supported within upper chamber 15 of sports bottle 12 provides the above-described rapid refilling capability due to the parallel arrangement of passages through the tubular members. Correspondingly, randomly directed brief duration splashing of the liquid supply within the sports bottle is resisted by the parallel arrangement of passages of the tubular members. As a result, antisplash element 70 provides the desired rapid fill and splash resistance for the present invention sports bottle.

FIG. 5 sets forth a still further alternate embodiment of the present invention in which a multiply segmented planar member generally referenced by numeral 80 is secured to mouth 16 in a snap-fit attachment. As described above, sports bottle 12 includes a vessel 11 defining an upper chamber 15 and a neck portion 14. Upper chamber 15 terminates in an open mouth 16. In accordance with the alternate embodiment of FIG. 5 generally referenced by numeral 80, a generally planar portion 81 defines an aperture 83 and a plurality of radial slices 84, 85, 86 and 87 which extend through the center of planar portion 81 and form a plurality of segments 90 through 97 therebetween. In its preferred form, slices 84 through 87 are of equal length and are equally spaced in angular relationship such that segments 90 through 97 formed as a result are generally equal and meet at a common center point. Planar member 80 further defines a downwardly extending lip 82 which is configured in correspondence to mouth 16 and notch 18 and thus is received upon mouth 16 and secured in a snap-fit attachment in which lip 82 extends downwardly through mouth 16 and maintains the position of planar member 80.

In its preferred form, planar member 80 is formed of a substantially thin flexible and slightly resilient material such that in the absence of any force upon planar member 80, segments 90 through 97 extend inwardly and generally meet at the center point of slices 84 through 87 in the configuration shown in FIG. 5. In its intended use, however, and in accordance with the present invention as the user dumps a container of water onto planar member 80 in the manner shown in FIG. 2 to refill vessel 11, the water stream flexes segments 90 through 97 downwardly into vessel 11 and thus provides an open aperture through which the flowing water may pass into vessel 11. Once the water flow terminates, the resilient character of segments 90 through 97 restores the segments to the generally closed configuration shown in FIG. 5. As the user employs the embodiment of FIG. 5 in the above-described cycling activity, the random brief duration splashing action of liquid within the vessel is captivated by the generally inward extension of segments 90 through 97 providing a resistance to liquid splashing from within vessel 11. The embodiment of FIG. 5 is capable of facilitating the rapid or quick refill described above while providing sufficient resistance to liquid splashing from within the vessel to maintain the liquid supply in a relatively secure storage.

FIG. 6 sets forth a still further alternate embodiment of the present invention in which a movable valve generally referenced by numeral 100 is supported within upper chamber 15 of vessel 11.

More specifically, FIG. 6 sets forth the top portion of sports bottle 10 showing neck 14, upper chamber 15 and mouth 16 of vessel 11 in dashed-line representation. Also shown in dashed-line representation are notch 18 formed in mouth 16 as well as a pair of oppositely positioned apertures 35 and 36. Apertures 35 and 36 are formed within the interior sidewall of upper chamber 15 and receive a pair of generally cylindrical pivot pins 103 and 104 of valve 100. Valve 100 is formed of a generally planar member 101 having pins 103 and 104 extending outwardly therefrom to support planar member 101 within mouth 16 of upper chamber 15 such that a portion of planar member 101 extends beneath notch 18. Planar member 101 further includes a counterweight 102 positioned oppositely from notch 18 on the outer portion of planar member 100. Counterweight 102 is sufficient in weight to counterbalance the portion of planar member 101 extending from pins 103 and 104 toward notch 18 and to bias the position of planar member 101 slightly in the direction indicated by arrow 107.

In operation, planar member 101 is positioned against the underside of notch 18 by the force of counterweight 102 tending to pivot counterweight 102 about pins 103 and 104 in the direction indicated by arrow 106. Correspondingly, this pivotal bias of counterweight 102 urges the remaining portion of planar member 101 upwardly in the direction indicated by arrow 107. This position corresponds to the normal position of valve 100 in which planar member 101 provides an antisplash element generally covering the opening of mouth 16 and precluding liquid within vessel 11 from splashing outwardly from the interior of vessel 11. When the user needs to refill sports bottle 10, the user simply pours the replenishing liquid through mouth 16 in the same manner set forth above in FIG. 2. The stream of water flowing downwardly through mouth 16 impacts planar member 101 of valve 100 pivoting planar member 101 in the direction indicated by arrow 105 and permitting the replenishing liquid to flow through mouth 16 and upper chamber 15 and neck 14 into liquid chamber 12 (seen in FIG. 1). Thus little, if any, resistance to the flow of replenishing liquid is provided and sports bottle 10 is quickly refilled. Once the flow of replenishing liquid is complete, counterweight 102 again pivots planar member 101 in the direction indicated by arrow 107 and restores its generally horizontal position closing mouth 16 and providing the above-described antisplash characteristic of the present invention sports bottle.

What has been shown is an effective sports bottle which is quickly and easily refillable by a cyclist or other athlete and which maintains the stored water supply in a splash resistant environment using a simple but effective operational system. The sports bottle provides an antisplash element above the liquid chamber which readily accommodates a rapid flow of refilling liquid through the antisplash element while maintaining the stored liquid in a splash resistant container. The entire sports bottle is easily secured to a conventional bicycle handlebar and stem assembly using a convenient mounting bracket and mounting strap having simple fabric attachment pads for securing the sports bottle in place. The bottle further includes an upwardly extending straw having a curved mouth tube secured thereto which permits the cyclist to take a drink from the sports bottle without leaving the aerodynamic position and without interrupting pedaling activities.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in receiving, storing and dispensing a liquid, a sports bottle comprising:

a vessel defining an interior storage chamber and an upwardly open mouth;

an antisplash means supported by said vessel proximate said mouth for receiving a flow of liquid through said mouth and into said interior chamber and for inhibiting splashing liquid within said chamber from passing outwardly through said mouth, said antisplash means including a porous member formed of a resilient open-cell porous material formed to define a solid element having a height substantially equal to its width and having a coarse porosity whereby a liquid pours directly therethrough without the need of a center aperture therein;

a suction tube defining an elongated hollow tube having a first end within said interior chamber and a second end extending upwardly beyond said mouth.

2. A sports bottle as set forth in claim 1 further including means for securing said vessel to a bicycle handle bar and neck support.

3. A sports bottle as set forth in claim 2 wherein said vessel defines a reduced neck portion above said storage chamber and an upper chamber extending from said neck portion to said mouth.

4. A sports bottle as set forth in claim 3 wherein said antisplash means are supported within said upper chamber.

5. A sports bottle as set forth in claim 4 wherein said mouth defines a first notch and wherein said porous member defines a second notch generally aligned with said first notch, said suction tube extends through said first and second notches.

6. A sports bottle as set forth in claim 5 wherein said vessel and said porous member are generally cylindrical.

7. A sports bottle as set forth in claim 3 wherein said means for securing includes:

a mounting bracket formed of a generally U-shaped member having a loop end received upon the neck of said bicycle and a pair of spaced apart forwardly extending prong ends received within said neck portion of said vessel; and a mounting strap having an end portion supporting a first fabric attachment pad and having an intermediate portion supporting second fabric attachment pad, said mounting strap being wrapped about said neck portion of said vessel overlying said prong ends to secure said vessel.

\* \* \* \* \*